United States Patent
Hayashi et al.

(10) Patent No.: US 10,384,712 B2
(45) Date of Patent: Aug. 20, 2019

(54) SENSOR APPARATUS AND ELECTRIC POWER STEERING APPARATUS USING THE SAME

(71) Applicant: DENSO CORPORATION, Kariya, Aichi-pref. (JP)

(72) Inventors: Katsuhiko Hayashi, Kariya (JP); Takaharu Kozawa, Kariya (JP); Shuji Kuramitsu, Kariya (JP); Kouichi Nakamura, Kariya (JP); Masaya Taki, Kariya (JP); Toshimitsu Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 240 days.

(21) Appl. No.: 15/256,277

(22) Filed: Sep. 2, 2016

(65) Prior Publication Data

US 2017/0072991 A1   Mar. 16, 2017

(30) Foreign Application Priority Data

Sep. 15, 2015   (JP) .................. 2015-181639

(51) Int. Cl.
*B62D 5/04* (2006.01)
*G01L 3/10* (2006.01)
(Continued)

(52) U.S. Cl.
CPC .......... *B62D 5/049* (2013.01); *B62D 5/0463* (2013.01); *G01L 3/101* (2013.01); *G01L 5/221* (2013.01); *G01L 25/003* (2013.01)

(58) Field of Classification Search
CPC ........ B62D 6/049; B62D 6/0463; B62D 6/10; B62D 5/049; B62D 5/0463; G01L 3/10;
(Continued)

(56) References Cited

U.S. PATENT DOCUMENTS 5,029,466 A * 7/1991 Nishihara .............. B62D 5/049
                                                    73/117.02
5,065,325 A * 11/1991 Takahashi .............. B62D 5/049
                                                    180/404
(Continued)

FOREIGN PATENT DOCUMENTS

JP    2009-202849    * 9/2000  .............. B62D 6/00
JP    2009-040225 A    2/2009

*Primary Examiner* — Joseph M Rocca
*Assistant Examiner* — Maurice L Williams
(74) *Attorney, Agent, or Firm* — Knobbe, Martens, Olson & Bear, LLP

(57) ABSTRACT

If abnormalities of the sensor part are detected, the power-source control section temporarily stops the electric power supply from the sensor power source to the sensor part so that the sensor power source voltage Vs which is the voltage between the sensor power source and the sensor part falls. In addition, after electric power supply to the sensor part resumes, and the sensor part is recovered from the abnormalities, then, the power source control section continues the electric power supply from the sensor power source to the sensor part. When the sensor part is not recovered from the abnormalities, the power source control section stops the electric power supply from the sensor power source to the sensor part.

7 Claims, 11 Drawing Sheets

(51) Int. Cl.
*G01L 5/22* (2006.01)
*G01L 25/00* (2006.01)

(58) Field of Classification Search
CPC . G01L 3/101; G01L 5/22; G01L 5/221; G01L 25/003
See application file for complete search history.

(56) References Cited

U.S. PATENT DOCUMENTS

| | | | | |
|---|---|---|---|---|
| 7,187,153 | B2* | 3/2007 | Imagawa | B62D 5/046 318/560 |
| 9,043,091 | B2* | 5/2015 | Hayama | B62D 6/00 701/29.2 |
| 9,573,619 | B2* | 2/2017 | Fukunaga | H04Q 9/00 |
| 9,614,767 | B2* | 4/2017 | Horihata | H04L 12/40039 |
| 9,796,409 | B2* | 10/2017 | Sasaki | B62D 5/0463 |
| 2003/0100981 | A1* | 5/2003 | Suzuki | B62D 5/049 701/43 |
| 2005/0242776 | A1* | 11/2005 | Emori | B60L 11/1855 320/116 |
| 2007/0029955 | A1* | 2/2007 | Kanekawa | H03M 1/485 318/144 |
| 2007/0225885 | A1* | 9/2007 | Hara | B62D 5/049 701/43 |
| 2008/0040001 | A1* | 2/2008 | Ogawa | B62D 5/008 701/41 |
| 2011/0098888 | A1* | 4/2011 | Kariatsumari | B62D 5/046 701/41 |
| 2013/0069635 | A1 | 3/2013 | Kitamoto | |
| 2013/0090813 | A1* | 4/2013 | Kanekawa | B62D 5/0481 701/43 |
| 2014/0180544 | A1* | 6/2014 | Itamoto | B62D 5/049 701/41 |
| 2014/0229062 | A1* | 8/2014 | Kimura | B62D 5/0481 701/41 |
| 2014/0246997 | A1* | 9/2014 | Suzuki | H02P 6/16 318/400.02 |
| 2014/0358375 | A1* | 12/2014 | Sakai | B62D 5/0463 701/41 |
| 2014/0368150 | A1* | 12/2014 | Furukawa | B62D 5/0403 318/564 |
| 2015/0066305 | A1 | 3/2015 | Kodera | |
| 2015/0066306 | A1* | 3/2015 | Kodera | B62D 5/0466 701/43 |
| 2015/0226627 | A1* | 8/2015 | Kuwahara | B62D 5/049 701/41 |
| 2015/0239492 | A1* | 8/2015 | Yukitake | B62D 5/003 701/43 |

* cited by examiner

SENSOR APPARATUS AND ELECTRIC POWER STEERING APPARATUS USING THE SAME

CROSS REFERENCE TO RELATED APPLICATION

This application is based on Japanese Patent Application No. 2015-181639 filed on Sep. 15, 2015, the disclosure of which is incorporated herein by reference.

TECHNICAL FIELD

The present disclosure relates to a sensor apparatus and the electric power-steering apparatus which using the same.

BACKGROUND

Conventionally, the sensor apparatus that have Hall devices as a position detection sensor is known. For example, in Patent Literature 1, the motor rotation angle sensor has a plurality of Hall devices and a plurality of switches which can cut power supplies of operational power to the plurality of Hall devices, respectively. In addition, if a short trouble occurs in one of Hall devices, corresponding switch will be turned off. Thereby, the Hall device with short trouble is separated from the system.

PATENT LITERATURES

Patent Literature 1: JP2013-64684A

SUMMARY

Patent Literature 1 is merely turned off the switch as a counter measure of abnormalities of a Hall device, and is silent about whether the Hall device once separated from the system may recover the normal or not. It is an object of the present disclosure to provide a sensor apparatus and an electric power steering apparatus using the same that can continue detection if it may recover the normal even if abnormalities are once detected.

A sensor apparatus has a sensor part and a control unit. The sensor part has a sensor element and an output circuit. The sensor element detects object physical quantity. The output circuit outputs the output signal according to the detection value of the sensor element. A control unit has a sensor power source and a control part. The sensor power source supplies electric power to the sensor part. The control part contains a receiving circuit, a power-source control section, and an abnormality determining section. The receiving circuit receives an output signal. The power-source control section controls a sensor power source. The abnormality determining section determines the abnormalities of the sensor part.

If abnormalities of the sensor part is detected, the power-source control section temporarily stops the electric power supply from the sensor power source to the sensor part so that the sensor power source voltage which is the voltage between the sensor power source and the sensor part falls. If the sensor part is recovered from the abnormalities after electric power supply to the sensor part resumes, the power-source control section continues the electric power supply from the sensor power source to the sensor part. If the sensor part is not recovered from the abnormalities after electric power supply to the sensor part resumes, the power source control section stops the electric power supply from the sensor power source to the sensor part.

If the abnormalities of the sensor part are detected, the power feed to the sensor part is stopped temporarily, and the sensor part is rebooted by resuming the power feed after that. If the sensor part is recovered from the abnormalities by the reboot, the power feed to the sensor part will be continued and detection of object physical quantity and the output of the output signal will be continued. Thereby, even if the abnormalities in the sensor part are detected, if it is possible to be recovered the sensor part from the abnormalities, it is possible to continue detection of the object physical quantity by the sensor part.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereafter, a sensor apparatus and an electric power steering apparatus using the sensor apparatus are explained based on drawings. In addition, hereafter, in a plurality of embodiments, the same code is given to substantially the same structures, and description may be omitted.

First Embodiment

Figure 1:
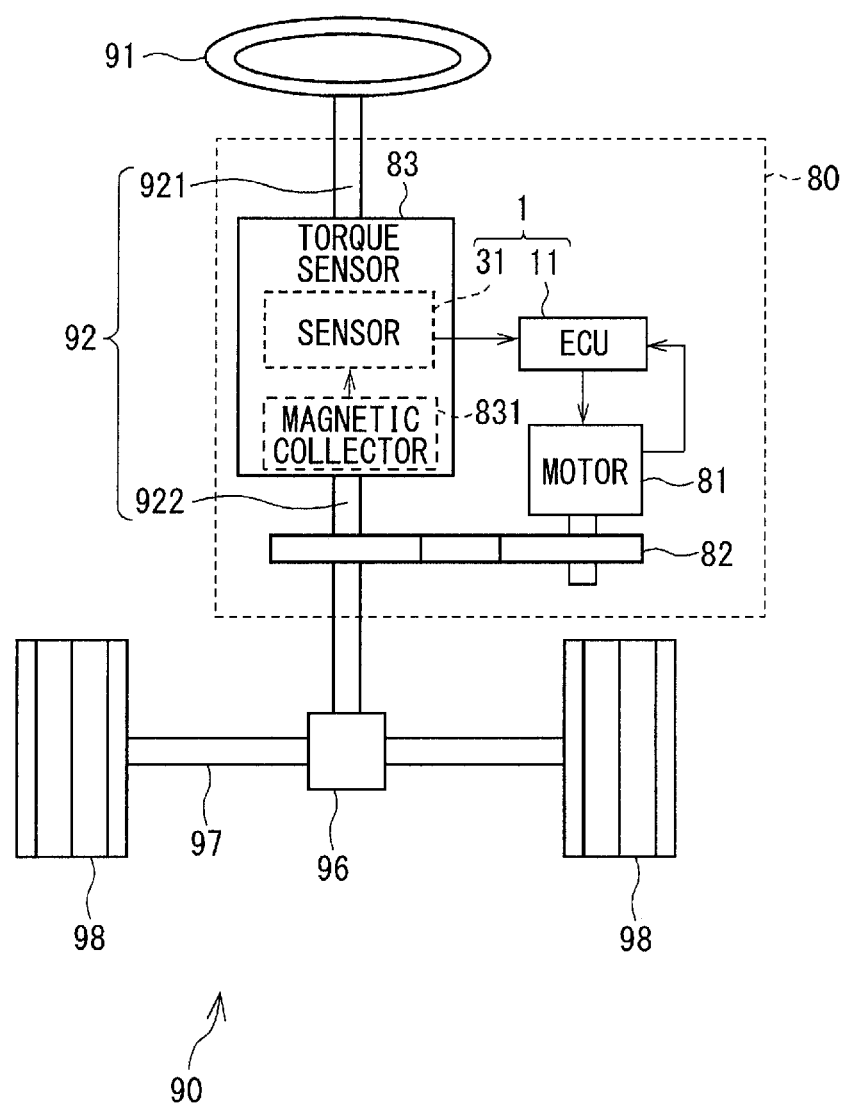
FIG. 1 is a diagram showing an outline structure of an electric power steering apparatus according to a first embodiment.

The first embodiment is shown in FIGS. 1-5. As shown in FIG. 1, a sensor apparatus 1 has ECU 11 as a control unit, and has a sensor part 31 etc. For example, the sensor apparatus 1 is applied to an electric power steering apparatus 80 for assisting steering actuation of vehicles.

FIG. 1 shows an entire configuration of a steering system 90 having an electric power steering apparatus 80. A steering wheel 91 as a steering member is connected with a steering shaft 92. The steering shaft 92 has an input shaft 921 as a first shaft and an output shaft 922 as a second shaft. The input shaft 921 is connected with the steering wheel 91. A torque sensor 83 is disposed between the input shaft 921 and the output shaft 922 to detect a torque added to the steering shaft 92. A pinion gear 96 is disposed at a distal end of the output shaft 922 opposite to the input shaft 921. The pinion gear 96 meshes to a rack shaft 97. A pair of wheels 98 is connected with the ends of the rack shaft 97 through a tie rod etc.

If an operator rotates the steering wheel 91, the steering shaft 92 connected to the steering wheel 91 will rotate. Rotary motion of the steering shaft 92 is changed into the rectilinear motion of the rack shaft 97 by the pinion gear 96, and the pair of wheels 98 is steered by the angle according to the amount of variation rates of the rack shaft 97.

The electric power steering apparatus 80 has the motor 81 which outputs an auxiliary torque which assists the operator's steering on the steering wheel 91, the reduction gear 82 which is transmitting parts, a torque sensor 83, and ECU 11 etc. Although the motor 81 and ECU 11 are in separate members in FIG. 1, the motor 81 and ECU 11 are integrally assembled.

The reduction gear 82 slows down revolutions of the motor 81, and transmits it to the steering shaft 92. That is, although the electric power steering apparatus 80 of this embodiment is a column assist type, the electric power steering apparatus 80 may be a rack assist type that transmits revolutions of the motor 81 to the rack shaft 97. In other words, although the steering shaft 92 corresponds to the object for actuation in this embodiment, the rack shaft 97 may be the object for actuation.

A torque sensor 83 is disposed with the steering shaft 92, and detects steering torque based on the twist angle of an input shaft 921 and an output shaft 922. The torque sensor 83 has a torsion bar which is not illustrated, a magnet collector part 831, and a sensor part 31 etc. A torsion bar connects the input shaft 921 and the output shaft 922 in the same axis on a rotary shaft, and transforms torque applied to the steering shaft 92 to a torsional displacement. The magnetic collector part 831 has a multi-pole magnet, a magnetic yoke, a magnetic collector ring, etc. The magnetic collector part 831 is constructed to vary a flux density in accordance with an amount of torsional displacement amount and torsional displacement direction of a torsion bar. A detailed illustration of the structure is omitted, since the general structure of the torque sensor 83 is well known.

Figure 2:
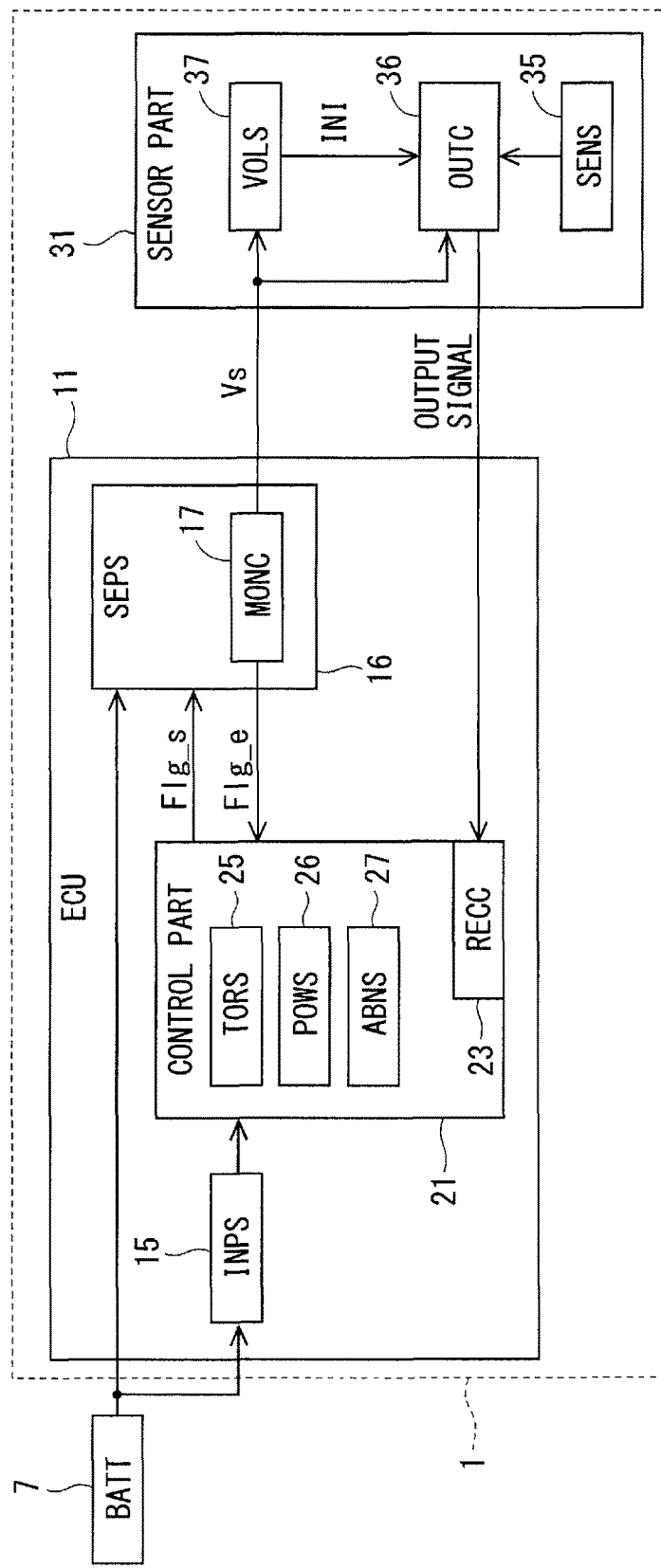
FIG. 2 is a block diagram showing a sensor apparatus according to the first embodiment.

As shown in FIG. 2, ECU 11 has an internal electrical power source (INPS) 15, a sensor power source (SEPS) 16, and a control part 21. The internal electrical power source 15 is a regulator which adjusts the voltage supplied from a battery (BATT) 7 to the set voltage Va. The electric power adjusted to predetermined voltage, i.e., the set voltage Va, by the internal electrical power source 15 is used inside ECU 11, i.e., the control part 21 etc. The sensor power source 16 is a regulator which is disposed separately from the internal electrical power source 15, and adjusts the voltage supplied from a battery 7 to the set voltage Vb. The electric power adjusted to predetermined voltage by the sensor power source 16 is supplied to the sensor part 31. The set voltage Va and the set voltage Vb may be equal, and may differ.

The sensor power source 16 has the monitor circuit (MONC) 17. The monitor circuit 17 monitors the abnormalities of power feed to the sensor part 31 based on the voltage and the current between the sensor power source 16 and the sensor part 31. For example, if short trouble has arisen within the sensor part 31, then the sensor power source current Is will become larger than that in the normal time. Likewise, if abnormalities arise in the sensor part 31, abnormalities of power feed will arise. In this embodiment, the monitor circuit 17 assumes and determines that there are any abnormalities of power feed, if the sensor power source current Is which is a current flowing to the sensor part 31 from the sensor power source 16 is larger than the current excess threshold value Ith. In addition, while performing the electric power supply from the sensor power source 16 to the sensor part 31, if the sensor power source voltage Vs which is the voltage between the sensor power source 16 and the sensor part 31 is out of a normal range, the monitor circuit 17 assumes and determines that there are any abnormalities of power feed. The normal range contains the set voltage Vb. The normal range is equal to or more than a normal lower limit VL, and is equal to or less than a normal upper limit VH.

The monitor circuit 17 sets an abnormal flag Flg_e, if the abnormalities of power feed has arisen. In addition, the monitor circuit 17 resets the abnormal flag Flg_e, if the abnormalities of power feed has not arisen. The abnormal flag Flg_e is transmitted to the control part 21. In this embodiment, the abnormal flag Flg_e corresponds to information about the abnormalities of power feed, which is acquired from the monitor circuit.

The control part 21 is constituted mainly be a microcomputer (MCOM) etc., and performs various operational processes. Each operational process in the control part 21 may be a software process by executing program memorized by substantive tangible and non-transitory memory apparatus, such as ROM, by CPU, may be a hardware process by an electronic circuit for exclusive use, and may be such combination. The electronic circuit may be a digital circuit containing a logic circuit, and/or may be analog circuit.

The control part 21 has the receiving circuit (RECC) 23, the torque operation section (TORS) 25, the power-source control section (POWS) 26, and abnormality determining section (ABNS) 27 etc. as functional blocks. The receiving circuit 23 acquires the output signal outputted from the sensor part 31. The torque operation section 25 calculates steering torque based on the acquired output signal. In addition, the motor control part in the control part 21, which is not illustrated, calculates the torque command value of the motor 81 based on the steering torque, and controls actuation of the motor 81 based on the torque command value.

The power-source control section 26 controls the electric power supply from the sensor power source 16 to the sensor part 31. In this embodiment, a power control flag Flg_s is transmitted to the sensor power source 16. The sensor power source 16 supplies electric power to the sensor part 31, when the power control flag Flg_s is set. The sensor power source 16 intercepts the electric power supply to the sensor part 31, when the power control flag Flg_s is not set.

In the following explanation, it is assumed that "1" shows the flags are set, and "0" shows the flags are not set. In addition, transmission of the information about abnormalities of the sensor part 31 from the monitor circuit 17, and power control from the power-source control section 26 to the sensor power source 16 may be performed except the flags.

The abnormality determining section 27 assumes and determines that there are any abnormalities in the sensor part 31, if the abnormal flag Flg_e is set. In addition, the abnormality determining section 27 determines the abnormalities of the sensor part 31 based on the output signal. For example, if the detection signal based on the detection value of the sensor element 35 shows an abnormal value, the abnormality determining section 27 determines the abnormalities in the sensor part 31. In addition, for example, if an adhesion abnormality, in which the counter value of the updating counter contained in a status signal is not updated, is detected, or a communication abnormality based on a CRC signal is detected, the abnormality determining section 27 may determines the abnormalities in the sensor part 31.

The sensor part 31 has a sensor element (SENS) 35, an output circuit (OUTC) 36, and a voltage monitoring section (VOLS) 37. The sensor element 35 is a magnetic detection element which detects change of the magnetic flux of the magnetic collector part 831 according to steering torque. The sensor element 35 of this embodiment is a Hall device. The detection signal of the sensor element 35 is outputted to the output circuit 36 via the A/D conversion circuit which is not illustrated.

The output circuit 36 generates an output signal including a detection signal based on an A/D converted detection value of the sensor element 35. The generated output signal is outputted to ECU 11 by the SENT (Single Edge Nibble Transmission) communication which is a kind of digital communication, for example. In this embodiment, the output signal includes a synchronizing signal, a status signal, a detection signal, a CRC signal, and a pause signal in this order.

The voltage monitoring section 37 monitors the sensor power source voltage Vs supplied from the sensor power source 16.

For example, if the electric power supply is intercepted by using a relay etc., during the abnormalities of the sensor part 31 are detected, after interception the detection value of the sensor part 31 cannot be used in ECU 11. In addition, if the sensor part 31 is in a certain kind of abnormalities, the sensor part 31 may be recovered from the abnormalities by rebooting the sensor part 31. So, in this embodiment, if the abnormalities of the sensor part 31 are detected, the reboot of the sensor part 31 is tried by controlling the sensor power source voltage Vs by the control part 21. Specifically, if the abnormalities of the sensor part 31 are detected, the power-source control section 26 resets the power control flag Flg_s, and temporarily turns off the sensor power source 16. When the sensor power source 16 is turned off, the sensor power source voltage Vs will fall.

In this embodiment, the voltage monitoring section 37 is monitoring the sensor power source voltage Vs in the sensor part 31. If the sensor power source voltage Vs becomes lower than the monitor electric potential Vth, the sensor part 31 is designed so that the output circuit 36 may be initialized (INI). After initializing the output circuit 36, if the electric power supply from the sensor power source 16 is resumed, the sensor part 31 is rebooted. If the sensor part 31 is recovered from the abnormalities by the reboot of the sensor part 31, detection of the steering torque by the sensor part 31 will be continued. In the reboot procedure, the electric power supply is once stopped, then, resumed within a certain short time. If the sensor part 31 is not recovered from the abnormalities, the sensor part 31 is stopped. In addition, the monitor electric potential Vth is set as a larger predetermined value than zero.

Figure 3:
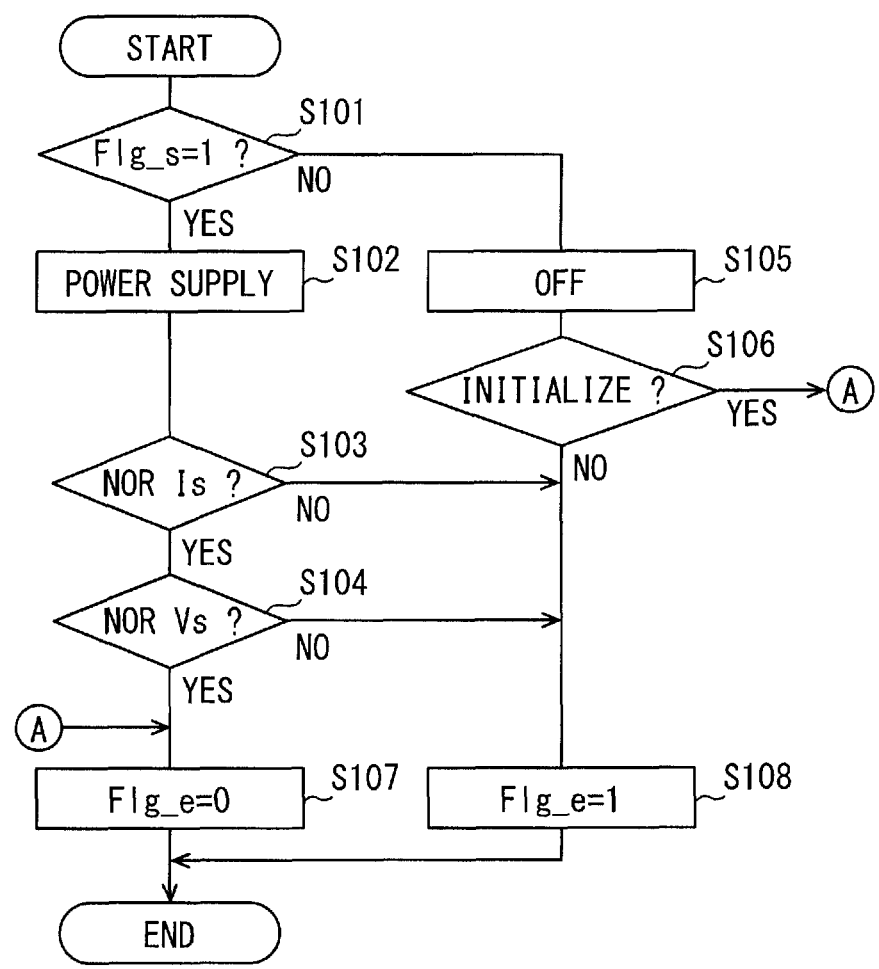
FIG. 3 is a flow chart showing a voltage monitoring process according to the first embodiment.

FIG. 3 is a flowchart explaining the voltage monitoring operation process in the sensor power source 16. This process is performed repeatedly at the predetermined interval by the sensor power source 16. At the first step, in S101, the sensor power source 16 determines whether the power control flag Flg_s transmitted from a control part 21 is set. Hereafter, the word "step" in "step S101" is skipped and the notation "S" only shows. Suppose that it is the same about other step numbers. When it is determined that the power control flag Flg_s is not set (S101: NO), process proceeds to S105. When it is determined that the power control flag Flg_s is set (S101: YES), process proceeds to S102. In S102, the sensor power source 16 adjusts the voltage supplied from the battery 7 to the set voltage Vb, and supplies it to the sensor part 31.

In S103, it is determined whether the monitor circuit 17 has the normal sensor power source current Is (NOR Is?) Here, if the sensor power source current Is is smaller than a current excess threshold value Ith, it is determined that it is normal. If it is determined that the sensor power source current Is is not normal (S103: NO), i.e., the sensor power source current Is is more than the current excess threshold value Ith, process proceeds to S108. If it is determined that the sensor power source current Is is normal (S103: YES), i.e., the sensor power source current Is is smaller than the current excess threshold value Ith, process proceeds to S104.

In S104, it is determined whether the monitor circuit 17 has the normal sensor power source voltage Vs (NOR Vs?) In a case that the sensor part 31 is normal, the sensor power source voltage Vs will serve as the set voltage Vb. In this embodiment, in a case that the sensor power source voltage Vs is in a range from equal to or more than the normal lower limit VL to equal to or less the normal upper limit VH, the range containing the set voltage Vb, it assumes that the sensor part 31 is normal. If it is determined that the sensor power source voltage Vs is not normal (S104: NO), process proceeds to S107. If it is determined that the sensor power source voltage Vs is normal (S104: YES), process proceeds to S107.

Operational process in S103 and S104 is process to determine abnormalities of power feed. If affirmative determinations are carried out in both S103 and S104, it assumes that there is no abnormalities of power feed in it. If a negative determination is carried out in S103 or S104, it assumes that there is at least one of the abnormalities of power feed in it. S103 and S104 may be exchanged. S103 or S104 may be omitted.

If the power control flag Flg_s is not set (S101: NO) process proceeds to S105. In S105, the sensor power source 16 intercepts the electric power supply to the sensor part 31. It turns off the electric power supply (OFF). In S106, the monitor circuit 17 determines whether the output circuit 36 was initialized (INITIALIZE?). In this embodiment, if the sensor power source voltage Vs becomes smaller than the monitor electric potential Vth, it assumes that the output circuit 36 was initialized. If it is determined that the output circuit 36 was initialized (S106: YES), process proceeds to S107. If it is determined that the output circuit 36 is not initialized (S106: NO), process proceeds to S108.

In S107, which is executed after in a case that there is no abnormalities of power feed (S103: YES and S104: YES) or in a case that the output circuit 36 is initialized (S106: YES), the monitor circuit 17 resets the abnormal flag Flg_e, and transmits it to the control part 21. In S108, which is executed after in a case that there is the abnormalities of power feed (S103: NO or S104: NO) or in a case that the output circuit 36 is not initialized (S106: NO), the monitor circuit 17 sets the abnormal flag Flg_e, and transmits is to the control part 21.

Figure 4:
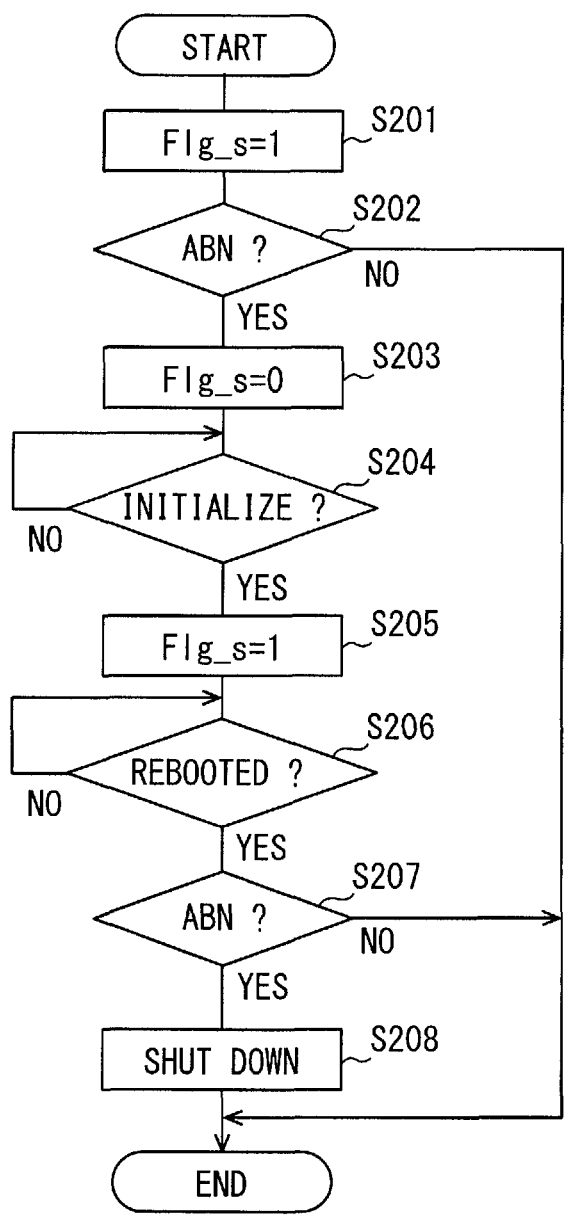
FIG. 4 is a flow chart showing an abnormal determining process according to the first embodiment.

FIG. 4 is a flow chart showing an abnormality determining operational process in the control part 21. In S201, the power-source control section 26 sets the power control flag Flg_s, and outputs it to the sensor power source 16. If it is a condition where the power control flag Flg_s is set, it continues the same condition that the flag is set. In S202, the abnormality determining section 27 determines whether abnormalities have arisen in the sensor part 31 based on abnormal flag Flg_e and an output signal (ABN?). If the abnormalities in the sensor part 31 is not determined (S202:

NO), the operation after S203 is not performed. If the abnormalities in the sensor part 31 is determined (S202: YES), the process proceeds to S203.

In S203, the power-source control section 26 resets the power control flag Flg_s, and outputs it to the sensor power source 16. Thereby, the electric power supply from the sensor power source 16 to the sensor part 31 is intercepted. In S204, the abnormality determining section 27 determines whether the output circuit 36 was initialized after electric power supply cutoff (INITIALIZE?). In this embodiment, since the output circuit 36 will be initialized and the abnormal flag Flg_e will be reset if the sensor power source voltage Vs becomes smaller than the monitor electric potential Vth, the abnormality determining section 27 will consider that the output circuit 36 was initialized if the abnormal flag Flg_e is reset. In a case that it is determined that the output circuit 36 is not initialized, i.e., in a case that the set condition of the abnormal flag Flg_e continues (S205: NO), this determination process is repeated. In addition, process may be alternatively arranged to proceed to S208 in a case that the abnormal flag Flg_e is continuously keep a set condition although a sufficient time period to lower the sensor power source voltage Vs to the monitor electric potential Vth had elapsed after electric power supply cutoff. In a case that it is determined that the output circuit 36 is initialized, i.e., in a case that the abnormal flag Flg_e is reset (S204: YES), process proceeds to S205.

In S205, the power-source control section 26 sets the power control flag Flg_s, and outputs it to the sensor power source 16, again. Thereby, the electric power supply from the sensor power source 16 to the sensor part 31 is resumed. In S206, the abnormality determining section 27 determines whether the reboot of the sensor part 31 was completed (REBOOTED?). Here, in a case that a certain time, which is necessary to reboot the sensor part 31, is elapsed after resuming electric power supply to the sensor part 31, it is assumed that the reboot of the sensor part 31 was completed. In a case that it is determined that the reboot of the sensor part 31 is not completed (S206: NO), this determination process is repeated. In a case that it is determined that the reboot of the sensor part 31 was completed (S206: YES), process proceeds to S207.

In S207, the abnormality determining section 27 determines whether abnormalities have arisen in the sensor part 31 based on the abnormal flag Flg_e and an output signal after the reboot (ABN?). In a case that it is determined that abnormalities have not arisen in the sensor part 31 (S207: NO), it assumes that the sensor part 31 is recovered normal by the reboot, and it continues detection of the steering torque by the sensor part 31. In a case that it is determined that abnormalities have arisen in the sensor part 31 (S207: YES), process proceeds to S208.

In S208, the sensor part 31 cannot be recovered from abnormalities even the sensor part 31 is rebooted, the power-source control section 26 resets the power control flag Flg_s, and outputs it to the sensor power source 16 (SHUT DOWN). Thereby, the electric power supply from the sensor power source 16 to the sensor part 31 is stopped, and the sensor part 31 is shut down during this operation. Shut down of the sensor part 31 continues as long as the command exists in the controller. In addition, the monitor circuit 17 stops the monitoring of the abnormalities of power feed to the sensor part 31.

Figure 5:
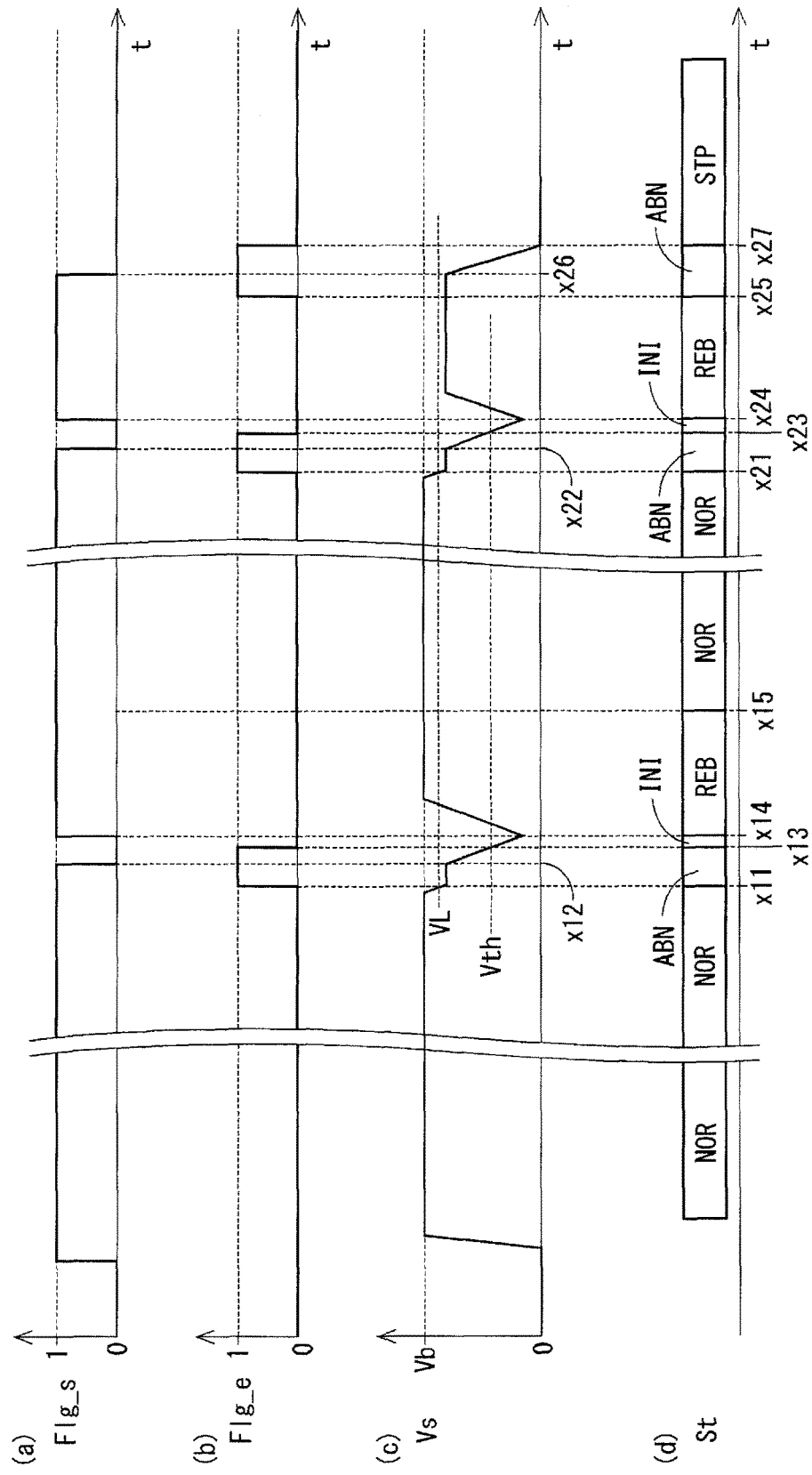
FIG. 5 is a time diagram showing a recovering process according to the first embodiment.

FIG. 5 is a time diagram to explain an abnormality determining operational process in this embodiment. In FIG. 5, (a) shows a power control flag Flg_s, (b) shows an abnormality flag Flg_e, (c) shows the sensor power source voltage Vs, and (d) shows an operational state St of the sensor part 31. In the drawings, NOR shows a normal state, ABN shows an abnormal state, INI shows an initializing state, REB shows a reboot state and STP shows a stop state. In addition, the time scale is changed suitably, and is not necessarily in agreement with an actual. In addition, a normal upper limit VH was omitted in FIG. 5 (c). In FIG. 5, it is assumed that the output signal is the normal. Abnormalities of power feed are mainly explained. It is the same in the following time diagram in the following embodiments.

As shown in FIG. 5, due to the power control flag Flg_s is set, then, the sensor part 31 is supplied with electric power. If the sensor power source voltage Vs is in a range between the normal upper limit VH and the normal lower limit VL when electric power is supplied to the sensor part 31, it assumes that the sensor part 31 is normal, and becomes the condition that the abnormal flag Flg_e is reset.

At time x11, the sensor power source current Is exceeds the current excess threshold value Ith, and the sensor power source voltage Vs becomes lower than the normal lower limit VL by the short trouble in the sensor part 21, for example. Then, the monitor circuit 17 sets the abnormal flag Flg_e, and transmits it to the control part 21. At the control part 21 acquires the abnormal flag Flg_e=1, i.e., at time x12, the power-source control section 26 resets the power control flag Flg_s, and intercepts the electric power supply from the sensor power source 16 to the sensor part 31. The sensor power source voltage Vs decreases in response to the intercept of the electric power supply, i.e., power cutoff to the sensor part 31.

At time x13, the sensor power source voltage Vs becomes smaller than the monitor electric potential Vth, then, the output circuit 36 is initialized. In this embodiment, the initialization of the output circuit 36 is performed in a phase that the sensor power source voltage Vs becomes smaller than the monitor electric potential Vth. Therefore, as compared with a case where it is initialized in response to complete power cutoff of the electric power supply to the sensor part 31, the initialization may be performed early timing.

In addition, the initialization of the output circuit 36 resets the abnormal flag Flg_e.

At the control part 21 acquires the abnormal flag Flg_e=0, i.e., at time x14, the power-source control section 26 sets the power control flag Flg_s, and resumes the electric power supply from the sensor power source 16 to the sensor part 31. If the electric power supply to the sensor part 31 is resumed, the sensor power source voltage Vs turns to increase, and the sensor part 31 is rebooted. In a time x15 completing the reboot operation, if abnormalities are not detected, the device assumes that the sensor part 31 is recovered to normal by reboot, and continues detection of the steering torque by the sensor part 31.

In addition, it is assumed that the abnormalities of the sensor part 31 are detected at time x21. The operational process from time x21 to time x24 is the same as operational process from the time x11 to the time x14. If abnormalities are again detected at the time x25 at which the reboot operation completed, the monitor circuit 17 transmits the abnormal flag Flg_e to the control part 21. The control part 21 acquires the abnormal flag Flg_e=1 at time x26, the power-source control section 26 resets the power control flag Flg_s, and intercepts the electric power supply from the sensor power source 16 to the sensor part 31. And, if the sensor power source voltage Vs becomes zero (0) at time x27, the device shuts down the sensor part 31. In addition, with the shutdown of the sensor part 31, the abnormal flag Flg_e is reset and the monitoring by the monitor circuit 17 is stopped. In addition, when rebooting the sensor part 31 by the abnormalities of the output signal, the sensor power source voltage Vs does not fall before the electric power supply cutoff from the sensor power source 16 and the abnormal flag Flg_e is not transmitted. Other embodiments are the same.

In this embodiment, in a case that the abnormalities of the sensor part 31 are detected, the devise tries whether the devise is recovered to normal by the reboot. The reboot operation may be performed a plurality of times. If the sensor part 31 can be recovered to normal by the reboot, even if the abnormalities are detected temporarily, it is possible to continue the detection of steering torque. In addition, in this embodiment, since the abnormalities of power feed is monitored by the sensor power source 16, as compared with a case where abnormalities of power feed is monitored by the control part 21, the operational process load of the control part 21 may be reduced.

In addition, in this embodiment, the sensor power source 16 is separately disposed with the internal electrical power source 15. Therefore, it is possible to reboot the sensor part 31 by intercepting the power feed to the sensor part 31 from the sensor power source 16, while continuing the power feed to the control part 21 from the internal electrical power source 15. Thereby, the sensor part 31 can be rebooted during condition of continuing operational process in the control part 21.

As explained above, the sensor device 1 of this embodiment has the sensor part 31 and ECU 11. The sensor part 31 has the sensor element 35 and the output circuit 36. The sensor element 35 detects the magnetic flux of the magnetic collector part 831 which is object physical quantity. The output circuit 36 outputs the output signal according to the detection value of the sensor element 35. ECU 11 has the sensor power source 16 and the control part 21. The sensor power source 16 supplies electric power to the sensor part 31.

The control part 21 has the receiving circuit 23, the power-source control section 26, and the abnormality determining section 27. The receiving circuit 23 receives an output signal. The power-source control section 26 controls the sensor power source 16. The abnormality determining section 27 determines the abnormalities of the sensor part 31. If in a case that the abnormalities of the sensor part 31 is detected, the power-source control section 26 temporarily stops the electric power supply from the sensor power source 16 to the sensor part 31 so that the sensor power source voltage Vs which is the voltage between the sensor power source 16 and the sensor part 31 falls. In addition, if the electric power supply to the sensor part 31 is resumed and the sensor part 31 is recovered from the abnormalities, i.e., the abnormalities once detected disappears, the power-source control section 26 continues the electric power supply from the sensor power source 16 to the sensor part 31. If the electric power supply to the sensor part 31 is resumed but the sensor part 31 is not recovered from the abnormalities, then the power-source control section 26 stops the electric power supply from the sensor power source 16 to the sensor part 31.

In this embodiment, if the abnormalities of the sensor part 31 are detected, the power feed to the sensor part 31 is stopped temporarily, and the sensor part 31 is rebooted by resuming the power feed after that. If abnormalities are canceled by the reboot of the sensor part 31, the power feed to the sensor part 31 will be continued and detection of object physical quantity and the output of an output signal will be continued. Thereby, even if the abnormalities in the sensor part 31 are detected, if it is possible to be recovered the sensor part 31 from the abnormalities, it is possible to continue detection of the object physical quantity by the sensor part 31. In addition, it is possible to continue operational process using the output signal of the sensor part 31 in the control part 21.

The sensor part 31 has the voltage monitoring section 37 which monitors the sensor power source voltage Vs. The output circuit 36 initializes the output circuit 36, if the sensor power source voltage Vs becomes lower than the monitor electric potential Vth. In a case that the sensor power source voltage Vs becomes lower than the monitor electric potential Vth, the power-source control section 26 assumes that the output circuit 36 was initialized, and resumes the electric power supply from the sensor power source 16 to the sensor part 31.

In this embodiment, the sensor part 31 has the voltage monitoring section 37, and in a case that the sensor power source voltage Vs becomes lower than monitor electric potential, the output circuit 36 is initialized internally. In other words, the output circuit 36 is initialized without reducing the sensor power source voltage Vs to zero (0). Thereby, as compared with the case where the sensor power source voltage Vs is reduced to zero (0), it is possible to shorten the period from detection of abnormalities of the sensor part 31 to the initialization.

The sensor power source 16 has the monitor circuit 17 which monitors abnormalities of power feed to the sensor part 31. The abnormality determining section 27 determines the abnormalities of the sensor part 31 based on the abnormal flag Flg_e which is information according to the abnormalities of power feed acquired from the monitor circuit 17. In detail, the abnormality determining section 27 assumes and determines that there are any abnormalities in the sensor part 31, if the abnormal flag Flg_e is set. It is possible to reduce operational process load in the control part 21 by monitoring abnormalities of power feed in the monitor circuit 17. The abnormality determining section 27 determines the abnormalities of the sensor part 31 based on the output signal. Thereby, the abnormalities of the sensor part 31 can be determined appropriately.

The sensor element 35 is a magnetic detection element to detect change of the magnetic flux which is changed according to the torque. Thereby, the sensor apparatus 1 can appropriately detect the torque, i.e., the steering torque in this embodiment.

The electric power steering apparatus 80 has the sensor apparatus 1, the motor 81, and the gear train as the reduction gear 82. The motor 81 outputs torque which may be called as auxiliary torque or assist toque to assist steering of the steering wheel 91 by the operator. The reduction gear 82 slows down revolutions of the motor 81, and transmits torque of the motor 81 to the steering shaft 92. The sensor part 31 is used as a torque sensor 83 which detects steering torque. The control part 21 controls actuation of the motor 81 based on the steering torque.

In this embodiment, even if it is a case where the abnormalities of the sensor part 31 are detected, if it can be recovered to normal by reboot it, it is possible to continue detection of the magnetic flux according to the steering torque by the sensor part 31. Since detection of the steering torque can be continued in the case that the sensor part 31 is recovered normal by the reboot, it is possible to continue the control of the electric power steering apparatus 80 based on the steering torque.

Second Embodiment

Figure 6:
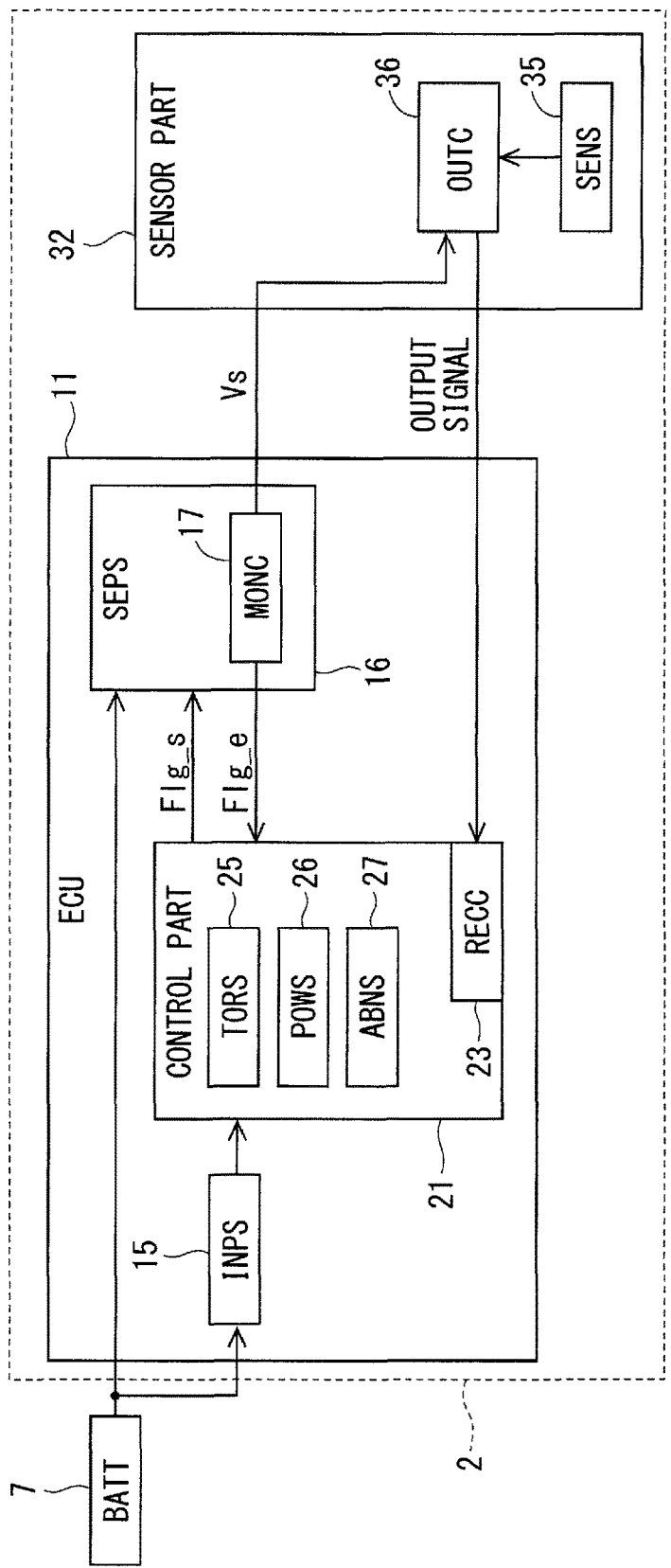
FIG. 6 is a block diagram showing a sensor apparatus according to a second embodiment.
Figure 7:
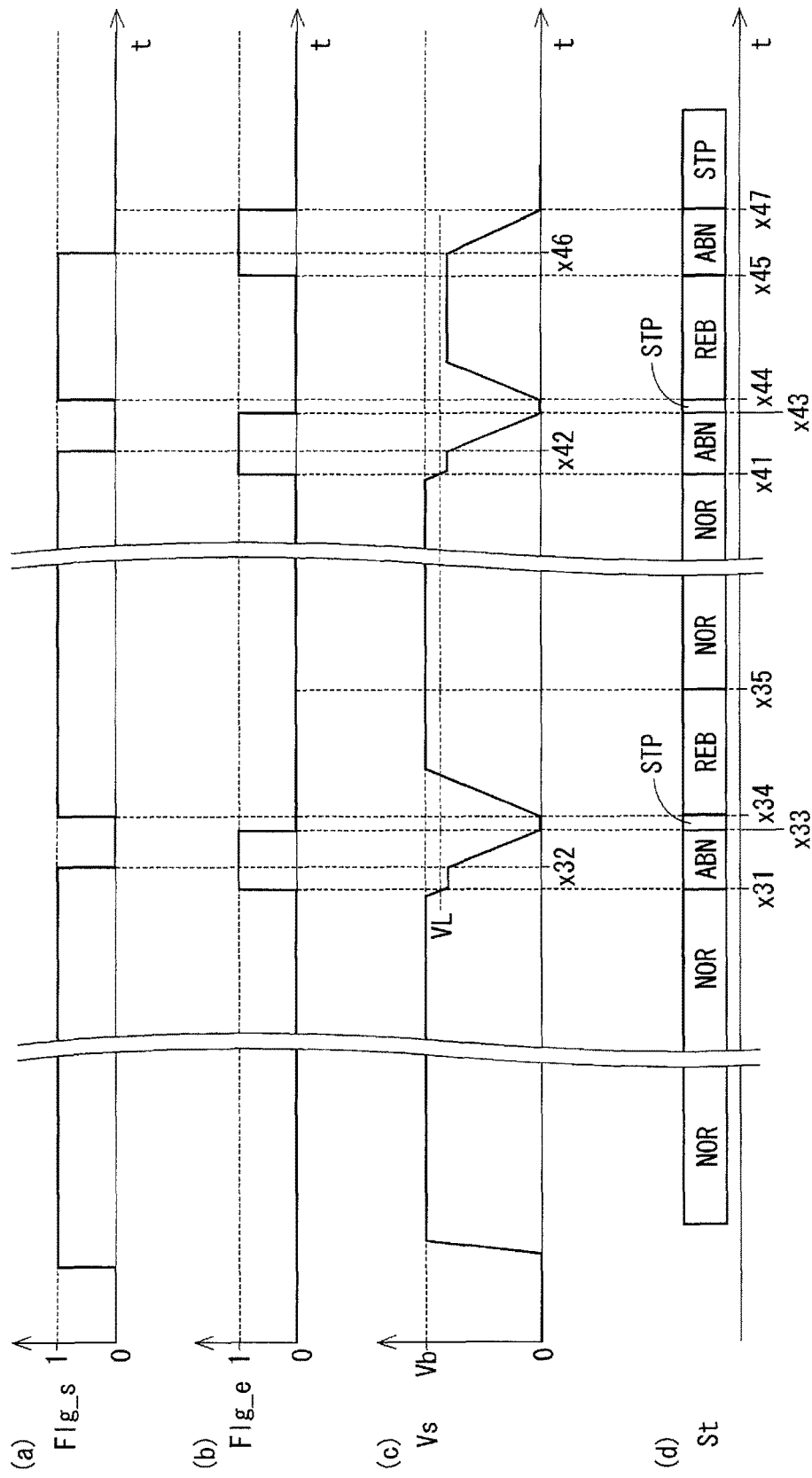
FIG. 7 is a time diagram showing a recovering process according to the second embodiment.

The second embodiment of the present disclosure is shown in FIGS. 6 and 7. As shown in FIG. 6, the sensor apparatus 2 has ECU 11 and the sensor part 32. The sensor part 32 is the same as that of the sensor part 31 of the above-mentioned embodiment except for the point that the voltage monitoring section 37 is omitted. That is, in this embodiment, the sensor part 32 is not monitoring the sensor power source voltage Vs.

In this embodiment, since the monitor electric potential Vth is not set, if the sensor power source voltage Vs becomes zero (0) at S106 in the voltage monitoring operation process in the sensor power source 16, the device may assume the output circuit 36 is initialized. In addition, the sensor power source voltage Vs is zero (0) during the sensor power source voltage Vs is smaller than a threshold value which is set value near zero (0). The point of others of the voltage monitoring operation process in the sensor power source 16, and the abnormality determining operational process in the control part 21 are the same as that of the above-mentioned embodiments.

The abnormality determining operational process in this embodiment is explained based on the time chart shown in FIG. 7. At time x31, if the sensor power source voltage Vs becomes lower than the normal lower limit VL, the monitor circuit 17 set the abnormal flag Flg_e, and transmits it to the control part 21. At the control part 21 acquires the abnormal flag Flg_e=1, i.e., at time x32, the power-source control section 26 resets the power control flag Flg_s, and intercepts the electric power supply from the sensor power source 16 to the sensor part 32. The sensor power source voltage Vs decreases in response to the intercept of the electric power supply, i.e., power cutoff to the sensor part 32.

At time x33, the operational process in the sensor part 32 is suspended in response to the sensor power source voltage Vs becomes zero (0). Thereby, the output circuit 36 is initialized. In addition, if the sensor power source voltage Vs becomes zero (0), the abnormal flag Flg_e is reset. At the control part 21 acquires the abnormal flag Flg_e=0, i.e., at time x34, the power-source control section 26 sets the power control flag Flg_s, and resumes the electric power supply from the sensor power source 16 to the sensor part 32. If the electric power supply to the sensor part 32 is resumed, the sensor power source voltage Vs turns to increase, and a reboot operational process is performed. That is, in this embodiment, after intercepting thoroughly the electric power supply to the sensor part 32, the sensor part 32 is rebooted by resuming the electric power supply. In addition, in this embodiment, since the electric power to the sensor part 32 is thoroughly intercepted at time x33, the reboot is performed from the condition that the output circuit 36 was initialized. At time x35 when the reboot operational process is completed, if no abnormality is detected, it is assumed that the sensor part 32 is recovered to normal by the reboot, and detection of the steering torque by the sensor part 32 is continued.

In addition, it is assumed that the abnormalities of the sensor part 32 are detected at time x41. The operational process in a period from the time x41 to time x44 is the same as the operational process from the time x31 to the time x34. At time x45 when the reboot operational process is completed, if any abnormalities are detected again, the monitor circuit 17 transmits the abnormal flag Flg_e to the control part 21. At time x46, if the control part 21 acquires the abnormal flag Flg_e, the power source control section 26 resets the power control flag Flg_s, and intercepts the electric power supply from the sensor power source 16 to the sensor part 32. At time x47, the sensor power source voltage Vs becomes zero (0), then, the sensor part 32 is shutdown. In addition, in response to the shutdown of the sensor part 32, the abnormal flag Flg_e is reset and the abnormalities monitoring process by the monitor circuit 17 is stopped.

In this embodiment, the power-source control section 26 stops the electric power supply from the sensor power source 16 to the sensor part 31, keeps it for a period until the sensor power source voltage Vs is set to zero, and then, resumes the electric power supply to the sensor part 31. In this embodiment, the sensor part 32 is initialized by stopping the sensor part 32 by reducing the sensor power source voltage Vs to zero (0), after that the sensor part 32 is rebooted by resuming the power feed. Thereby, since it is possible to omit the voltage monitoring function in the sensor part 32, it is possible to simplify the sensor part 32. In addition, the same effects in the above-mentioned embodiments are also available.

Third Embodiment

Figure 8:
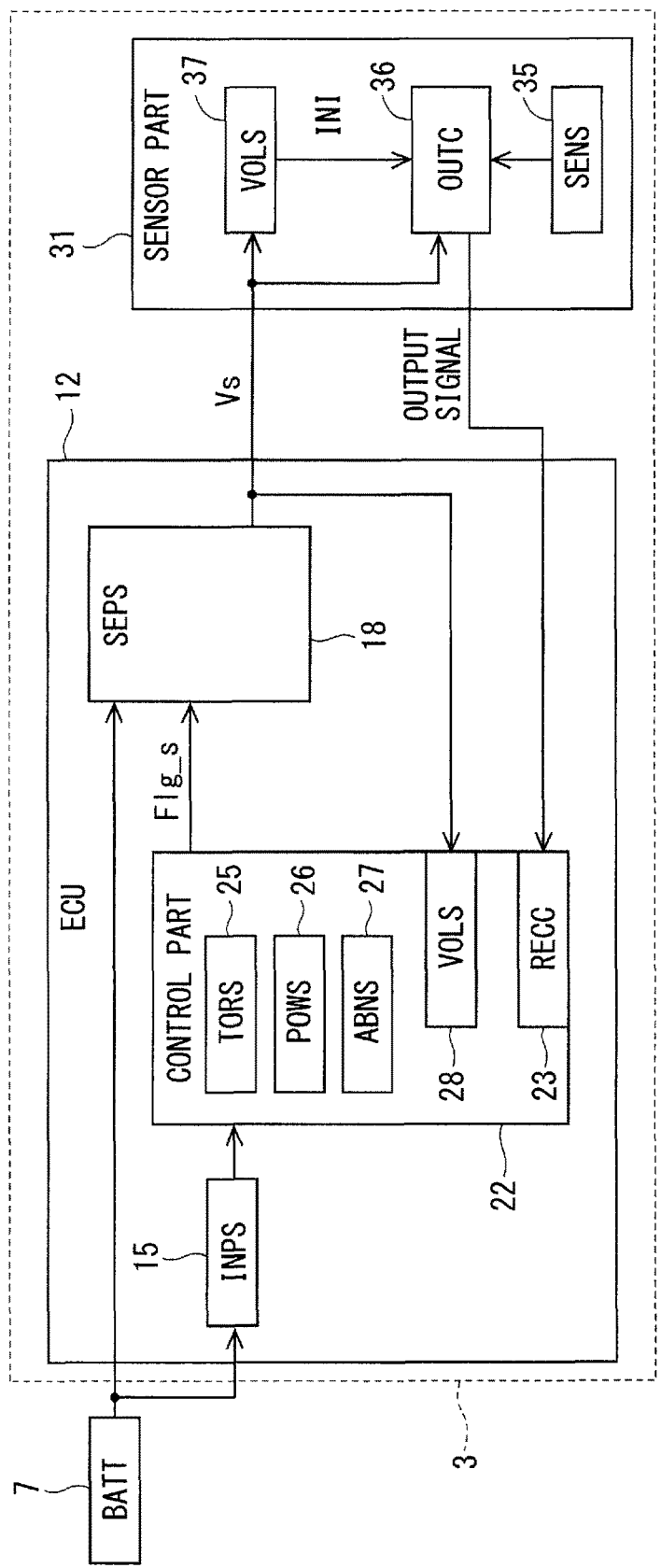
FIG. 8 is a block diagram showing a sensor apparatus according to a third embodiment.
Figure 9:
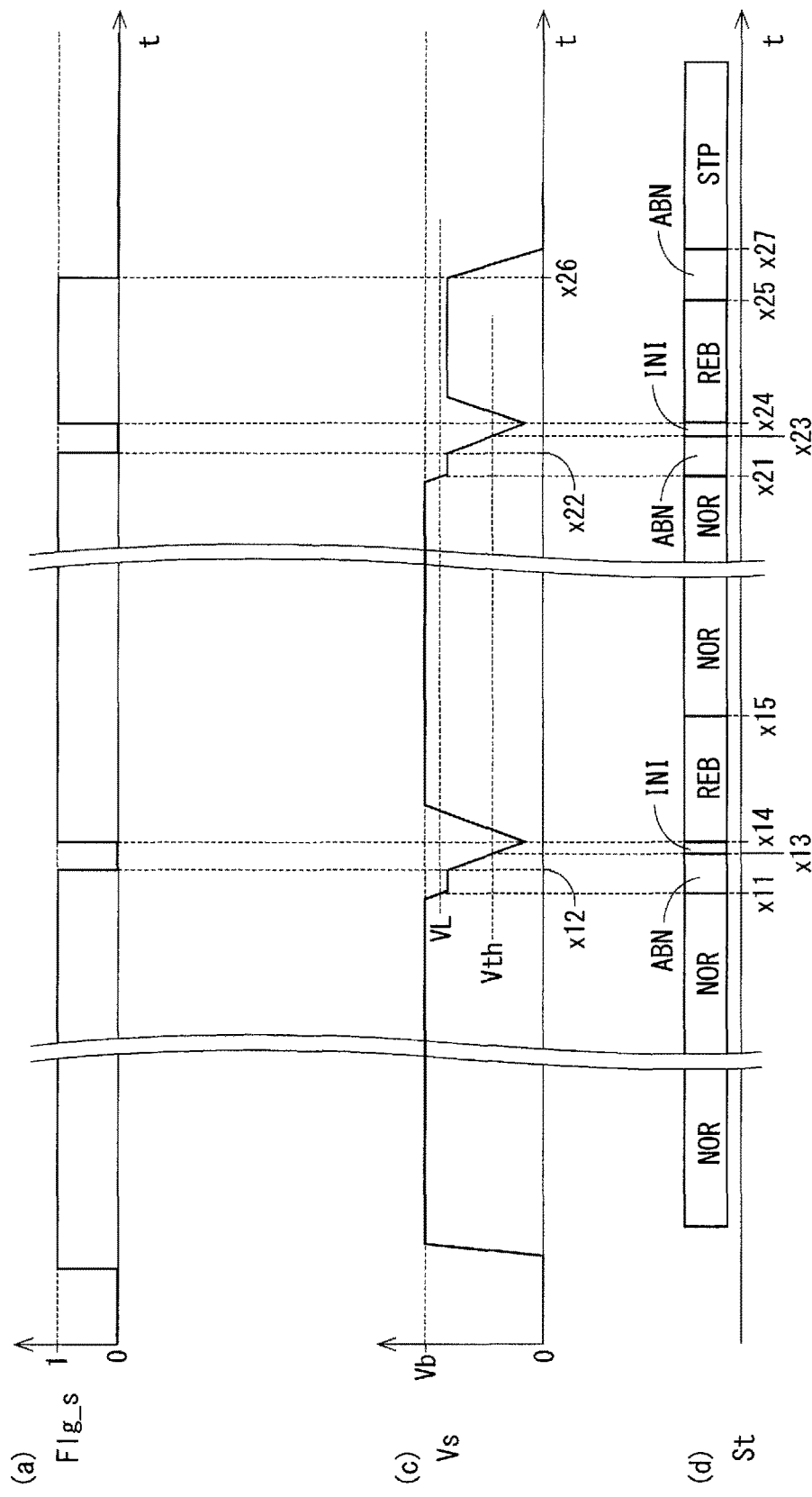
FIG. 9 is a time diagram showing a recovering process according to the third embodiment.

The third embodiment of the present disclosure is shown in FIGS. 8 and 9. As shown in FIG. 6, the sensor apparatus 3 has ECU 11 as a control unit and the sensor part 31. ECU 11 has the internal electrical power source 15, a sensor power source 16 and a control part 22. The sensor power source 18 is the same as the sensor power source 16 in the above-mentioned embodiments except for the point that the monitor circuit 17 is omitted. As for the operational process by the sensor power source 18, the process in S101, S102, and S105 in FIG. 3 is performed, and other operational process are omitted.

In addition to the receiving circuit 23, the torque operation section 25, the power-source control section 26, and the abnormality determining section 27, the control part 22 has a voltage acquiring section (VOLS) 28. The voltage acquiring section 28 acquires the sensor power source voltage Vs via the A/D conversion part which is not illustrated. The sensor power source voltage Vs acquired by the voltage acquiring section 28 is used for the abnormality determining process of the sensor part 31 in the abnormality determining section 27. That is, in this embodiment, the sensor power source voltage Vs is monitored by the control part 22 instead of the sensor power source 18. In addition, a current retrieving section which acquires the sensor power source current Is may be disposed in addition to the voltage acquiring section 28. In addition, in a case that the current retrieving section is disposed, the voltage acquiring section 28 may be omitted.

Here, the abnormality determining operational process in the control part 22 is explained. In this embodiment, the abnormality determining process of the sensor part 31 is performed in S202 and S207 in FIG. 4 based on the sensor power source voltage Vs acquired by the voltage acquiring section 28 instead of the abnormal flag Flg_e. That is, it is assumed that there is no abnormality of power feed, if the sensor power source voltage Vs is in a range. The range is between the normal lower limit VL and the normal upper limit VH. If the sensor power source voltage Vs is equal to or higher than the normal lower limit VL and the sensor power source voltage Vs is equal to or lower than the normal upper limit VH (VL<=Vs and Vs<=VH), it is determined that the sensor power source voltage Vs is in the range. Contrary, it is assumed that there is any abnormality of power feed, if the sensor power source voltage Vs is out of the range. If the sensor power source voltage Vs is lower than the normal lower limit VL or the sensor power source voltage Vs is higher than the normal upper limit VH (Vs<VL or VH<Vs), it is determined that the sensor power source voltage Vs is out of the range. The abnormality determining process based on the output signal is the same as that in the first embodiment.

In addition, in S204, whether the output circuit 36 was initialized or not is determined based on the sensor power source voltage Vs instead of the abnormality flag Flg_e. It determines that the output circuit 36 was initialized in a case that the sensor power source voltage Vs is lower than the monitor electric potential Vth. It determines that the output circuit 36 is not initialized in a case that the sensor power source voltage Vs equal to or higher than the monitor electric potential Vth. The other points are the same as in the first embodiment.

FIG. 9 is a time diagram to explain an abnormality determining process in this embodiment. In this embodiment, a detailed description of the abnormality determining section 27 is omitted, since the abnormality determining section 27 is similar to that in the first embodiment except that it determines the abnormalities of the sensor part 31 based on the sensor power source voltage Vs internally acquired from the voltage acquiring section 28 instead of the abnormal flag Flg_e. In addition, in FIG. 9, the wave form (b) is omitted as a missing number in order to be consistent with FIG. 5.

In this embodiment, the control part 22 has the voltage acquiring section 28 which acquires the sensor power source voltage Vs. The abnormality determining section 27 determines the abnormalities of the sensor part 31 based on the sensor power source voltage Vs acquired by the voltage acquiring section 28. In this embodiment, the sensor power source voltage Vs is acquired by the control part 22. Thereby, since the monitoring function of the abnormalities of power feed in the sensor power source 18 is omissible, the sensor power source 18 can be simplified. In addition, it is possible to achieve effects similar to that in the above-mentioned embodiments.

Fourth Embodiment

Figure 10:
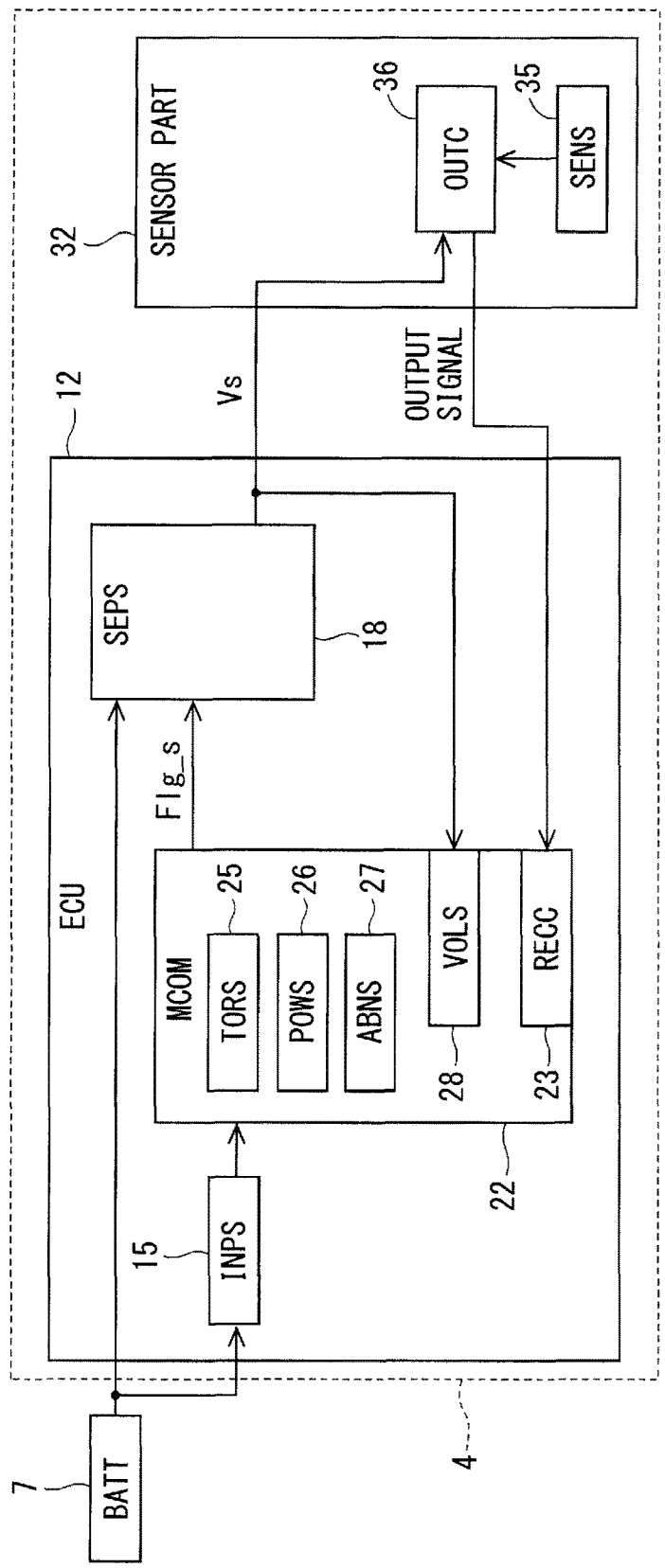
FIG. 10 is a block diagram showing a sensor apparatus according to a fourth embodiment.
Figure 11:
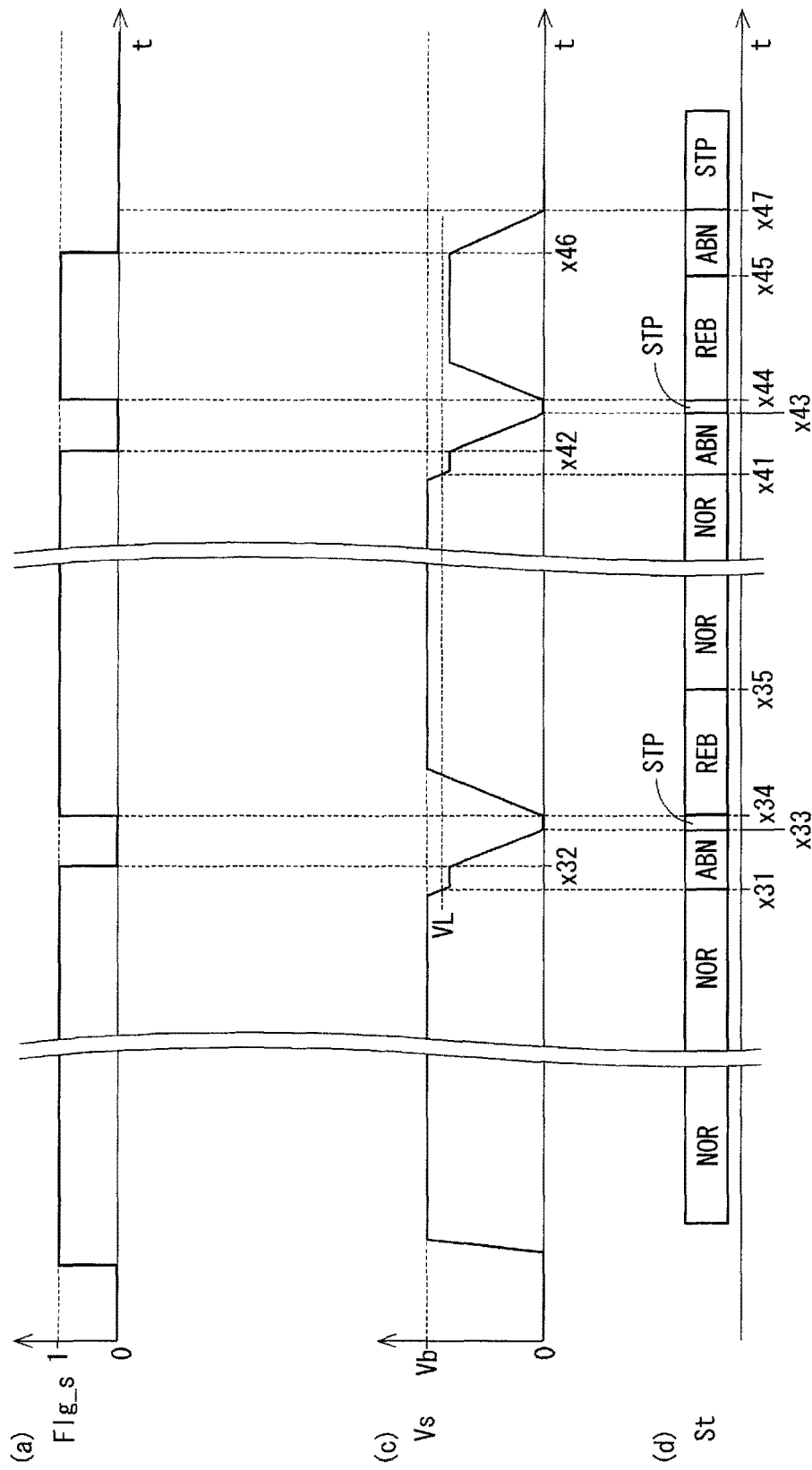
FIG. 11 is a time diagram showing a recovering process according to the fourth embodiment.

The fourth embodiment of the present disclosure is shown in FIGS. 10 and 11. As shown in FIG. 10, the sensor apparatus 4 has ECU 12 and the sensor part 32. The sensor apparatus 4 is different from the sensor apparatus 3 in the third embodiment in a point that it has the sensor part 32 in the second embodiment as an alternative to the sensor part 31. The others are the same.

That is, in this embodiment, the abnormalities of power feed are monitored by the control part 22 like in the third embodiment. In addition, like the second embodiment, the sensor part 32 does not monitor the sensor power source voltage Vs, and the monitor electric potential Vth is not set. Therefore, in this embodiment, after the complete cut off of the electric power supply to the sensor part 32 to make the sensor power source voltage Vs reaches to zero (0), then, the sensor part 32 is rebooted by resuming the electric power supply.

In this embodiment, in S204 of the abnormality determining process, the determination whether the output circuit 36 is initialized or not is determined based on the sensor power source voltage Vs instead of the abnormality flag Flg_e. In this embodiment, it determines that the output circuit 36 is initialized in a case that the sensor power source voltage Vs is zero (0). It determines that the output circuit 36 is not initialized in a case that the sensor power source voltage Vs is not zero (0). The sensor power source voltage Vs is assumed as zero (0), when it is smaller than the determination value set as the value near zero (0) like the second embodiment. The other points of the abnormality determining operational process in the control part 22 and the operational process in the sensor power source 18 are the same as that in the third embodiment.

FIG. 11 is a time diagram to explain an abnormality determining process in this embodiment. In this embodiment, a detailed description of the abnormality determining section 27 is omitted, since the abnormality determining section 27 is similar to that in the second embodiment except for it determines the abnormalities of the sensor part 32 based on the sensor power source voltage Vs internally acquired from the voltage acquiring section 28 instead of the abnormal flag Flg_e. In addition, in FIG. 11, the wave form (b) is omitted as a missing number in order to be consistent with FIG. 7.

Thereby, in this embodiment, similar to the second embodiment, since the voltage monitoring function in the sensor part 32 is omitted, it is possible to simplify the sensor part 32. In addition, similar to the third embodiment, since the monitoring function of the abnormalities of power feed in the sensor power source 18 is omitted, the sensor power source 18 can be simplified.

In addition, it is possible to achieve effects similar to that in the above-mentioned embodiments.

Other Embodiments (a) Reboot Process

In the first embodiment and the third embodiment, if the sensor power source voltage becomes lower than the monitor electric potential, the electric power supply to the sensor part is resumed by assuming that the output circuit was initialized. In addition, in the second embodiment and the fourth embodiment, if the sensor power source voltage becomes zero (0), the electric power supply to the sensor part is resumed by assuming that it is assumed that the output circuit was initialized. In the other embodiments, the electric power supply to the sensor part may be resumed in a case that an initializing necessary time necessary for performing the initialization of the output circuit was elapsed from intercepting the electric power supply to the sensor part. Here, in a case that the sensor part has a voltage monitoring function, the initializing necessary time may be set according to a period which is necessary to lower the sensor power source voltage to the monitor electric potential. In addition, in a case that the sensor part does not have a voltage monitoring function, the initializing necessary time may be set according to a period taken which is necessary to lower the sensor power source voltage to zero (0).

(b) Sensor Apparatus

In the preceding embodiment, the sensor apparatus has one sensor part. In other embodiments, two or more sensor parts may be disposed. In the preceding embodiments, one sensor element is disposed in one sensor part. In the other embodiments, one sensor part may be disposed with a plurality of sensor elements. In this case, the output signal may include detection signals based on operational process such as a central value or the average value amongst the detection values of a plurality of sensor elements, and/or the outputs signal may include the detection signals according to each detection value of a plurality of sensor elements.

In the preceding embodiments, the sensor element 35 is a Hall device. In other embodiments, the sensor elements may be magnetic detection elements other than a Hall device, and may be elements which detect physical quantity other than the magnetic quantity.

In the preceding embodiments, the sensor part is disposed in the torque sensor which detects steering torque. In other embodiments, a sensor part may detect any kind of physical quantity, such as torque other than steering torque, a rotation angle, a stroke, a load, and a pressure amount etc.

In the preceding embodiment, the output circuit outputs the output signal to the control unit from the sensor part by SENT communication. In other embodiments, an output circuit may output an output signal with digital-communication manners other than SENT communication, and may output an output signal by analog communication.

In the preceding embodiments, the sensor apparatus is applied and used as the torque sensor of the electric power steering apparatus. In other embodiments, the sensor apparatus may be applied to in-vehicle apparatus other than the electric power steering apparatus, and may be applied to apparatus other than the in-vehicle apparatus.

As mentioned above, the present disclosure is not limited to the above-mentioned embodiments at all, and may be carried out with various forms in the range which does not deviate from the meaning of disclosure.

The control unit (controller) is an electrical control unit (ECU). The controller has at least one processing unit (CPU) and at least one memory device (MMR) provided as a storage medium which stores a set of program and data. The controller is provided with a microcomputer having the storage medium readable by a computer. The storage medium is a non-transitory storage medium which stores a program readable by the computer. The storage medium can be provided by a device, such as a solid state memory device and a magnetic disc memory. The controller is provided with one computer, or a set of computer resources linked by a data communication device. The program, when executed by the controller, makes the controller to function as devices described in this specification, and makes the controller to perform methods described in this specification. The controller provides a plurality of various elements. At least a part of those elements may be called as means for performing functions, and, in another aspect, at least a part of those elements may be called as structural blocks or modules.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, are preferred, other combinations and configurations, including more, less or only a single element, are also within the spirit and scope of the present disclosure.

What is claimed is:

1. A sensor apparatus comprising:
a sensor part which has a sensor element which detects an object physical quantity, and an output circuit which outputs an output signal according to a detection value of the sensor element, the detection value being indicative of the object physical quantity; and
a control unit which has a sensor power source which supplies electric power to the sensor part, and a control part comprising a receiving circuit which receives the output signal, a power-source control section which controls the sensor power source, and an abnormality determining section which determines the abnormalities of the sensor part, wherein
the power-source control section temporarily stops the electric power supply from the sensor power source to the sensor part in response to abnormalities of the sensor part being detected, so that the sensor power source voltage between the sensor power source and the sensor part falls, continues the electric power supply from the sensor power source to the sensor part, in response to the sensor part recovering from the abnormalities after the electric power supply is resumed from the temporal stop, and stops the electric power supply from the sensor power source to the sensor part in response to the sensor part not recovering from the abnormalities after the electric power supply is resumed from the temporal stop,
the sensor part has a voltage monitoring section which monitors the sensor power source voltage,
the voltage monitoring section initializes the output circuit, in response to the sensor power source voltage becoming lower than a monitor electric potential, and
the power source control section assumes the output circuit being initialized and resumes the electric power supply from the sensor power source to the sensor part in response to the sensor power source voltage becoming lower than the monitor electric potential.

2. The sensor apparatus in claim 1, wherein
in response to the abnormalities of the sensor part being detected, the power-source control section stops the electric power supply from the sensor power source to the sensor part until the sensor power source voltage becomes 0, and after that, resumes the electric power supply to the sensor part.

3. The sensor apparatus in claim 1, wherein
the sensor power source has a monitor circuit which monitors abnormalities of power feed to the sensor part, and
the abnormality determining section determines the abnormalities of the sensor part based on information about the abnormalities of power feed acquired from the monitor circuit.

4. The sensor apparatus in claim 1, wherein
the control part has a voltage acquiring section which acquires the sensor power source voltage, and
the abnormality determining section determines the abnormalities of the sensor part based on the sensor power source voltage acquired in the voltage acquiring section.

5. The sensor apparatus in claim 1, wherein
the abnormality determining section determines the abnormalities of the sensor part based on the output signal.

6. The sensor apparatus in claim 1, wherein
the sensor element is a magnetic detection element which detects change of the magnetic flux which may change according to a torque.

7. An electronic power steering apparatus comprising:
a sensor apparatus claimed in claim 6;
a motor which outputs an auxiliary torque to assist steering of a steering member by an operator; and
a transmitting power part which transmits a torque of the motor to an object to be actuated, wherein
the sensor part is used as a torque sensor which detects steering torque, and
the control part controls actuation of the motor based on the steering torque.

* * * * *